US008217764B2

(12) United States Patent
Hsu

(10) Patent No.: US 8,217,764 B2
(45) Date of Patent: Jul. 10, 2012

(54) SUBAREA CONTROL SYSTEM OF ELECTRICAL LIGHTING SEPARATED BY A DEMARCATION REPEATER

(76) Inventor: Chia-Yi Hsu, Taipei (TW)

( * ) Notice: Subject to any disclaimer, the term of this patent is extended or adjusted under 35 U.S.C. 154(b) by 925 days.

(21) Appl. No.: 12/298,541

(22) PCT Filed: Mar. 19, 2007

(86) PCT No.: PCT/CN2007/000878

§ 371 (c)(1),
(2), (4) Date: Oct. 27, 2008

(87) PCT Pub. No.: WO2007/124656

PCT Pub. Date: Nov. 8, 2007

(65) Prior Publication Data

US 2009/0085499 A1 Apr. 2, 2009

(30) Foreign Application Priority Data

Apr. 28, 2006 (CN) .......................... 2006 1 0076528

(51) Int. Cl.
*G08C 19/12* (2006.01)
*G08B 1/08* (2006.01)
*H04M 11/04* (2006.01)

(52) U.S. Cl. ................... 340/13.23; 340/12.32; 340/538

(58) Field of Classification Search ............... 340/13.23, 340/310.1, 151, 870.02, 12.32, 538; 333/81; 307/9.1
See application file for complete search history.

(56) References Cited

U.S. PATENT DOCUMENTS 4,302,750 A * 11/1981 Wadhwani et al. ...... 340/870.02
4,535,401 A * 8/1985 Penn ................................ 700/3
4,763,104 A * 8/1988 Inoue et al. .................. 375/257
5,287,343 A * 2/1994 Nakamura et al. ............ 370/243
5,495,406 A * 2/1996 Kushiro et al. ................. 700/22
5,838,226 A * 11/1998 Houggy et al. ............ 340/12.32
5,866,992 A * 2/1999 Geiginger et al. ........... 340/9.16
6,459,938 B1 * 10/2002 Ito et al. ............................ 700/9
6,834,091 B2 * 12/2004 Litwin et al. .................. 375/356
7,339,466 B2 * 3/2008 Mansfield et al. ............ 340/538
7,352,282 B2 * 4/2008 Yanagida et al. ............. 340/538
7,437,217 B2 * 10/2008 Lehr et al. ..................... 700/297
7,688,183 B2 * 3/2010 Lester ........................ 340/12.33
7,821,210 B2 * 10/2010 Markstaler .................... 315/291
2003/0036807 A1 * 2/2003 Fosler .............................. 700/3

* cited by examiner

*Primary Examiner* — Nam V Nguyen
(74) *Attorney, Agent, or Firm* — Guice Patents PLLC

(57) ABSTRACT

A subarea control system of electrical lighting separated by a demarcation repeater 6 comprises: a bus power supply 5 connected to the electric supply 1; at least a demarcation repeater 6 connected to the bus power supply 5 via a bi-phase digital information transmission bus 2 to establish a contact with the uplink bus, while the demarcation repeater 6 need to be connected to the electric supply 1; a system controller 7 connected to the bi-phase digital information transmission bus 2 to form a transmission path 9 so as to broadcast the system instructions within the whole system; at least a subarea controller 8 connected to the bi-phase digital information transmission bus 2; at least a group of lamp controllers 3 respectively connected to the bi-phase digital information transmission bus 2 to receive the information instructions and to access the electric supply 1; the subarea controller 8 and the lamp controllers 3 form a subarea instruction transmission path 10 whose boundary is the demarcation repeater 6, and the subarea instructions are valid on the subarea instruction transmission path 10.

17 Claims, 4 Drawing Sheets

SUBAREA CONTROL SYSTEM OF ELECTRICAL LIGHTING SEPARATED BY A DEMARCATION REPEATER

BACKGROUND OF THE INVENTION

1. Field of the Invention

The present invention relates to a control system of electrical light, comprises a control method and the apparatus thereof, more particularly to a control system of electrical lighting that is utilized in a place where there are plural rooms or plural areas that need to be individually controlled. The above mentioned rooms refer to any space for human activities; the above mentioned areas refer to the partial spaces of a room or outer periphery of a room.

2. Description of Related Art

With developments of electronic units and electrical controlling methods, an electrical lighting art has been developed to a digital control system, wherein the digital addressable lighting interface (DALI) regulated by IEC 60929 (2003) is a typical example. The regulation is originally applied to a lighting control of fluorescent lamps, but due to the features of reliable, compact and reasonable pricing, the regulation has been applied to all control systems of electrical lighting. In view of the worldwide energy and environment issues, energy-saving is more important than ever, so an auto lighting control system is gradually become necessary.

The conventional digital control system of electrical lighting is an extended art of computer technology, via network like serial bus transferring control information so as to control a control system of electrical lighting, the function thereof is high but the cost thereof is also not low, thus the application thereof is limited and is only applied on some particular occasions.

The digital addressable lighting interface was developed in Europe and then was accepted by the whole world. The structure thereof is basically composed by a bus power supply, at least one controller and lamp controllers having digital addressable lighting interfaces. Each loop of the digital addressable light interfaces can control up to 64 individual lamps; in the initial setting, each of the lamp controllers is assigned with an address code. According to the address, the system can send commands to individual lamp. When utilized, the lamps is preferably to be grouped, after the group data is saved in each memory of the lamps, as disclosed in the European Patent No. 90100465.6, a group can be deemed as one unit for receiving commands. A circuit can be set up to 16 groups (0-15), each of the lamps can be categorized in plural groups at the same time, but the actual applications are varied according to the actual needs, some products only allow setting up one group.

The application of “group” is very important and convenient, e.g. a room is categorized to at least one group, so the controller can individually control the whole room, the controller in the room has be to preset the groups that the controller is about to control so right commands can be sent and no mistake is likely to occur. Take an office for instance, the office has plural rooms and one meeting room. For achieving the object of energy-saving, each of the rooms has to be able to individually controlled, so the electrical lighting can be turned off or lower the brightness when no human is in that particular room. If the lighting in each of the rooms is desired to be individually controlled, then each of the lightings have be to individually assigned with one group code, controllers and sensors related to the room have also to be set to the same group code. Lightings in the meeting room may be categorized to three groups, e.g. one on the platform, one on the meeting table and one for the wall lamps provided on the lateral walls, for meeting the needs of speeches, meetings, or multi media displaying. For more easily to sent commands to each of the lighting groups, a group controller can be provided in each of the rooms, when pressing group keys of the group controller, commands are sent and are received by the particular lighting group, without a doubt that the relationship mentioned above needs to be preset or the group controller and the lightings to be controller would not able to have connections. The method for grouping controllers can refers to The German Patent No. 4327809.4, a general group controller has 4 group selecting keys.

After the operation of grouping, each of the lighting groups can be adjusted to a proper brightness so a whole lighting scene is obtained. On some occasions, e.g. a multi-function meeting room, plural lighting scenes may be needed to meet the different requirements. For preventing from frequent adjustments, a lighting scene controller can be served to save the related information of each of the lighting scenes such as the group number and the brightness into a memory, so by pressing a scene selecting key the original setting can be recalled, a general lighting scene controller has 4 to 8 scene selecting keys.

One features of a system of digital addressable lighting interface is the ability of address searching, and the grouping of the whole system, the scene settings and lighting adjustments are all based on said feature. But the work of initial group setting, scene setting and brightness setting is sometimes complicated that may need skilled people in the art and professional tools to complete.

One loop of a digital addressable lighting interface can has up to 64 controllers, each of the controllers has its own address (a sensor is also deemed as a controller), and objects to be controlled by each of the controllers have to be preset. But by hand-on experiences, for a circuit of a digital addressable lighting interface, the lamps thereof can only be categorized to 16 groups which is not practically enough. For example, more quantity of rooms or more complicated lighting scenes can not be supported by the existing groups so one more loop is therefore needed.

SUMMARY OF THE INVENTION

One object of the present invention is to provide a subarea control system of electrical lighting separated by a demarcation repeater and the control method of the same, so the layout or design of lighting tools and various types controllers and sensors is more flexible, and the control of electrical lighting is more convenient and simple, the energy-saving of lighting and the effect of lighting scene are more easily to be carried out.

The present invention provides a subarea control system of electrical lighting separated by a demarcation repeater, comprises:

a bus power supply connected to the electric supply to provide a DC voltage and a function of current limiting to a bi-phase digital information transmission bus;

at least one demarcation repeater connected to the bus power supply via the bi-phase digital information transmission bus to establish a contact with an uplink bus, while the demarcation repeater needs to be connected to the electric supply to provide a bus power to a downlink bus;

a system controller connected to the bi-phase digital information transmission bus, a transmission path is formed by the system controller and the bi-phase digital information transmission bus, and the potential of the transmission information bus is controlled according to system instructions to broadcast the system instructions to the whole system;

at least one subarea controller connected to the bi-phase digital information transmission bus, the potential of the information transmission cable is controlled according to subarea instructions;

at least one group of lamp controllers respectively connected to the bi-phase digital information transmission bus to receive information instructions and to access the electric supply so the lamps are controlled according to the information instructions;

the subarea controller and the lamp controllers form a subarea instruction transmission path whose boundary is the demarcation repeater, and the subarea instructions are valid on the subarea instruction transmission path.

At least one control sensor is further provided and is connected to the bi-phase digital information transmission bus; the potential of the information transmission cable is controlled according to the instructions.

Wherein the control sensor is a human activity sensor or a light sensor or a timer.

Wherein each of the lamp controllers includes a control section and a lamp.

Wherein the control instructions of the system controller and the subarea controller are categorized to single-way instructions, dual-way system instructions or subarea instructions.

Wherein the control instructions are grouped by the length of bytes and the content of bytes, and are respectively defined as a system instruction group and a subarea instruction group.

Wherein the demarcation repeater includes an uplink bus end and a downlink bus end.

Wherein the demarcation repeater, the system controller, the subarea controller and the sensor provided within have functions of collision identifying and detecting.

Wherein a digital information processing device of the demarcation repeater includes a decoding and register memory device, when receiving signals and a relay operation is processed, the decoding and register memory device is served to decode the system instructions and register in the memory device, when subject to a collision, the operations of decoding and registering are not stopped and a resend operation is processed after a delayed time.

Wherein a relay controller of the digital information processing device has a function of comparing the highest digit after the start bit to identify the system instructions or the subarea instructions.

The present invention also provides a subarea control method of electrical lighting separated by a demarcation repeater, comprises the steps of:

the power is turned on so the system is in a standby status;

a system controller and a subarea controller respectively send instructions to a bi-phase digital information transmission bus, the system controller sends the system instructions and the subarea sends the subarea instructions;

the system instructions are processed with a relay operation and the subarea instructions are processed with a terminate operation, both by the demarcation repeater; the lamp controllers process operations of instruction receiving and decoding to the system instructions and the subarea instructions, so control of the lamps is achieved.

Wherein the control instructions of the communication protocols of the control system are categorized to single-way system instructions, dual-way system instructions and subarea instructions.

Wherein the demarcation repeater includes an uplink bus end and a downlink bus end.

Wherein the demarcation repeater, the system controller, the subarea controller and the sensors provided within have functions of collision identifying and detection.

Wherein a digital information processing device of the demarcation repeater includes a decoding and register memory device, when receiving signals and a relay operation is processed, the decoding and register memory device is served to decode the system instructions and register in the memory device, when subject to a collision, the operations of decoding and registering are not stopped and a resent operation is processed after a delayed time.

Wherein a relay controller of the digital information processing device has a function of comparing the highest digit after the start bit to identify the system instruction or the subarea instruction.

BRIEF DESCRIPTION OF THE DRAWINGS

FIG. 4 is a waveform diagram of the communication protocols of the system instruction and the subarea instruction, wherein FIG. 4-1 is the waveform of the system instruction; FIG. 4-2 is the waveform of the subarea instruction;

DETAILED DESCRIPTION OF THE PREFERRED EMBODIMENT

Figure 1:
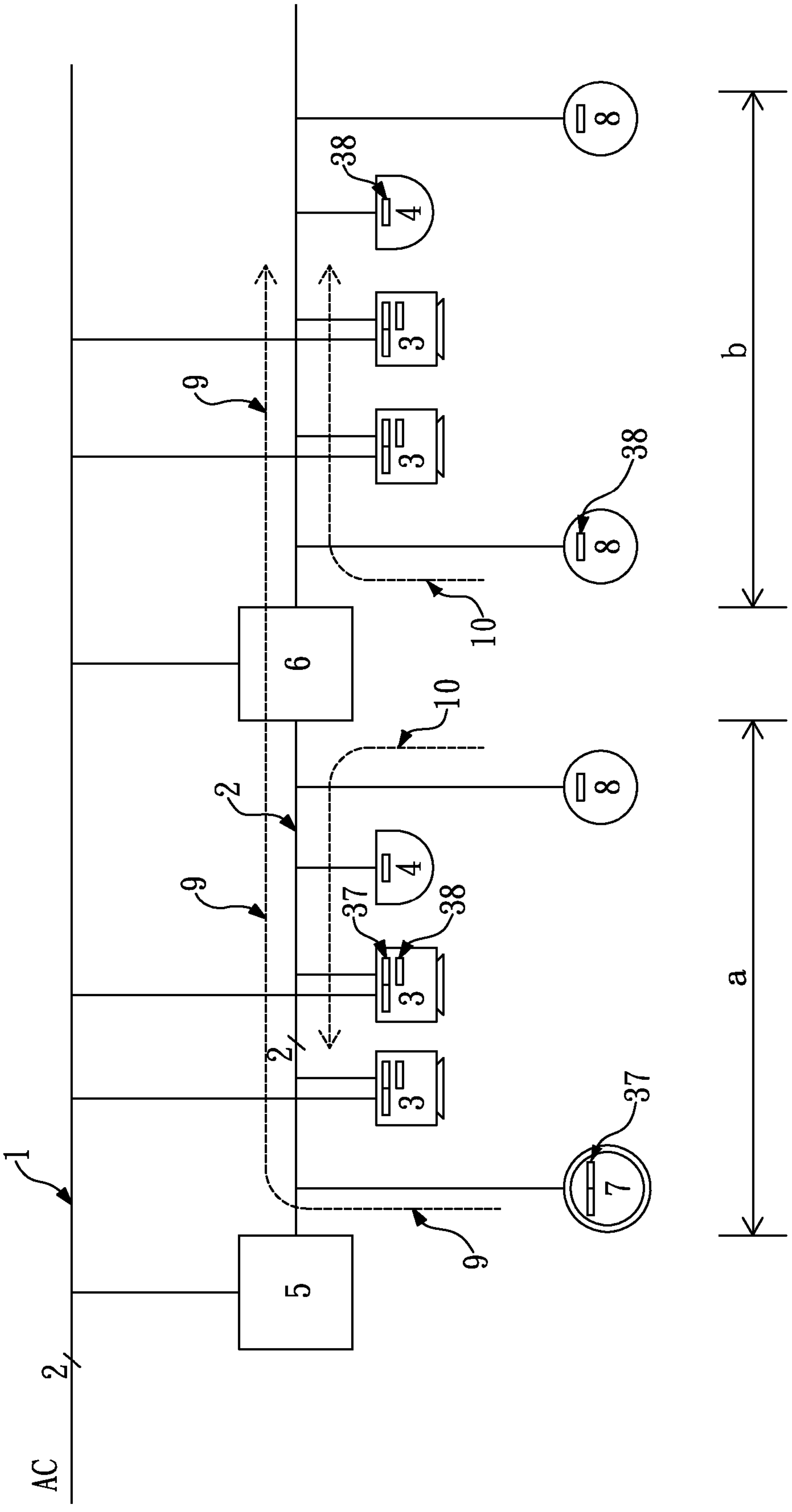
FIG. 1 is a structural schematic view of the system provided by the present invention.
Figure 2:
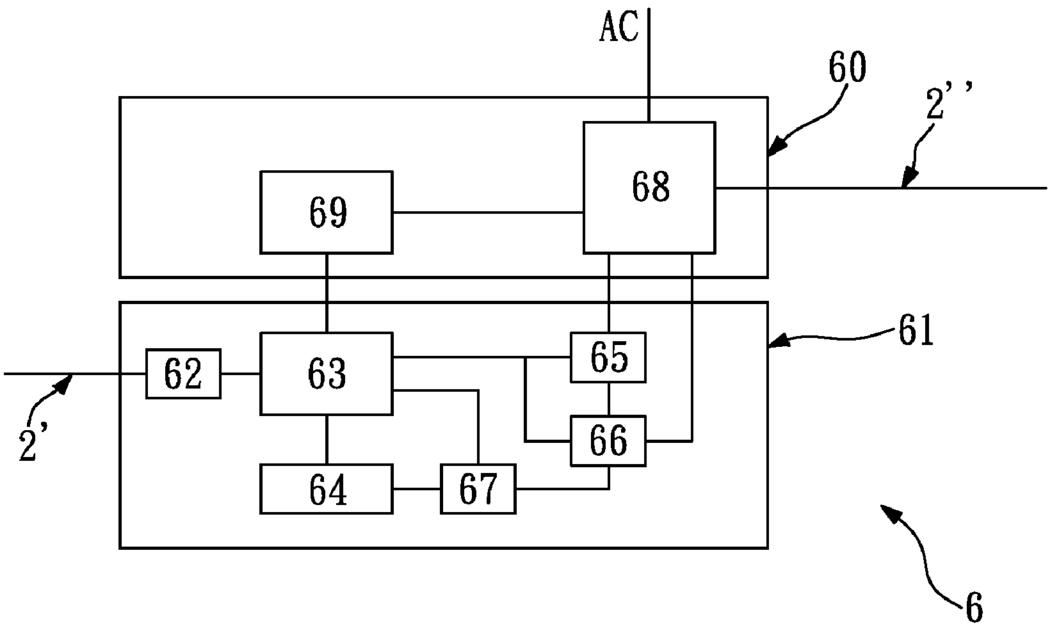
FIG. 2 is a structural schematic view of the demarcation repeater provided by the present invention.
Figure 3:
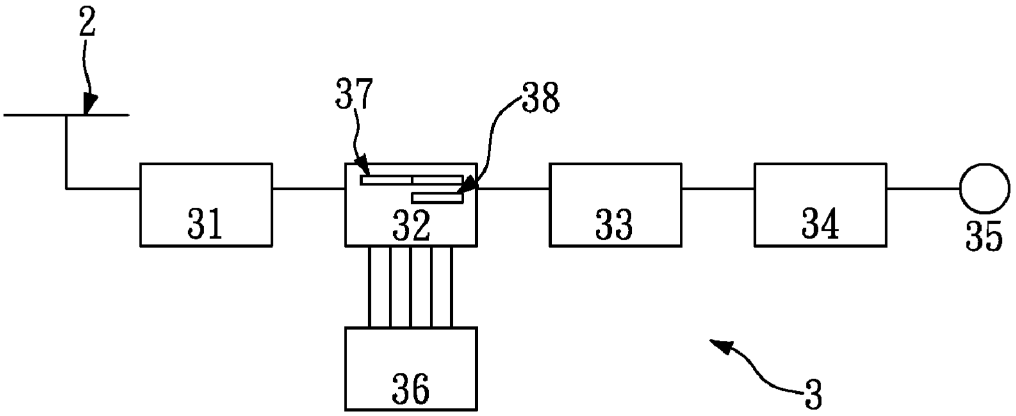
FIG. 3 is a structural schematic view of the lamp controller provided by the present invention.

Referring to FIG. 1, the present invention provides a subarea control system of electrical lighting separated by a demarcation repeater, comprises:

a bus power supply 5, the bus power supply is connect to the electric supply 1 and provides a DC voltage and a function of current limiting to a bi-phase digital information transmission bus 2;

at least one demarcation repeater 6 connected to the bus power supply 5 via the bi-phase digital information transmission bus 2 to establish a contact with an uplink bus 2' (as shown in FIG. 2), while the demarcation repeater 6 needs to be connected to the electric supply 1 to provide a bus power to a downlink bus 2"; wherein the demarcation repeater 6 includes the above mentioned uplink bus 2' and the downlink bus 2"; wherein a digital information processing device 61 of the demarcation repeater 6 includes a decoding and register memory device, when receiving signals and an relay operation is processed, the decoding and register memory device is served to decode system instructions and register in the memory device, when subject to a collision, the operations of decoding and registering are not stopped and a resent operation is processed after a delayed time; wherein a relay controller 63 of the digital information processing device 61 has a function of comparing the highest digit after the start bit to identifying the system instruction or the subarea instruction;

referring to FIG. 1, a system controller 7 is connected to the bi-phase digital information transmission bus 2, the system controller 7 and the bi-phase digital information transmission bus 2 form a transmission path 9, and a potential of a transmission information bus is controlled according to the system instructions to broadcast the system instructions to the whole system; wherein the control instructions of the system controller and the subarea controller are categorized to single-way system instructions, dual-way system instructions and subarea instructions; wherein the control instructions are grouped by the length of the bytes or the content of the bytes;

at least one subarea controller 8, the at least one subarea controller 8 is connected to the bi-phase digital information transmission bus 2, the potential of an information transmission cable is controlled according to the subarea instructions;

at least one group of lamp controller 3 (as shown in FIG. 3), each of the lamp controllers 3 includes a control section and a lamp. Each of the lamp controllers 3 is respectively connected to the bi-phase digital information transmission bus 2 to receive information instructions and to access the electric supply 1 so the lamps are controlled according to the information instructions; wherein each of the lamp controllers 3 includes a control section and a lamp;

the subarea controller 8 and the lamp controllers 3 form a subarea instruction transmission path 10 whose boundary is the demarcation repeater 6, and the subarea instructions are valid on the subarea instruction transmission path 10.

A human activity sensor 4 is further provided, the human activity sensor 4 is connected to the bi-phase digital information transmission bus 2, and the potential of the information transmission cable is controlled according to the transmitted instructions.

The demarcation repeater 6, the system controller 7, the subarea controller 8 and the sensors provided within have functions of collision identifying and detecting.

The present invention also provides a subarea control method of electrical lighting separated by a demarcation repeater, comprises the steps of:

the power is turned on so the system is in a standby status;

as shown in FIG. 1, the system controller 7 and the subarea controller 8 respectively send instructions to the bi-phase digital information transmission bus 2, the system controller 7 sends the system instructions 37 and the subarea controller 8 sends the subarea instructions 38; wherein the demarcation repeater 6, the system controller 7, the subarea controller and the sensors provided within have functions of collision identifying and detecting; wherein the system instructions 37 are processed with a relay operation and the subarea instructions 38 are processed with a terminate operation, both by the demarcation repeater 6;

as shown in FIG. 2, the demarcation repeater 6 includes an uplink bus 2' and a downlink bus 2''; wherein a digital information processing device 61 of the demarcation repeater 6 includes a decoding and register memory device, when receiving signals and an relay operation is processed, the operations of decoding and registering the system instructions and the relay operation can be processed at the same time, when subject to a collision, the operations of decoding and registering are not stopped and a resend operation is processed after a delayed time; wherein a relay controller 63 of the digital information processing device 61 has a function of comparing the highest digit after the start bit to identifying the system instructions 37 or the subarea instructions 38;

the lamp controllers 3 process operations instruction receiving and decoding to the system instructions 37 and the subarea instructions 38, so the control of the lamps are achieved.

Wherein the control instructions of the communication protocols of the control system are categorized to single-way system instructions, dual-way system instructions and subarea instructions, the control instructions are grouped by the length of the bytes and the content of the bytes so a system instruction group and a subarea instruction group are defined.

Figures 1, 4:
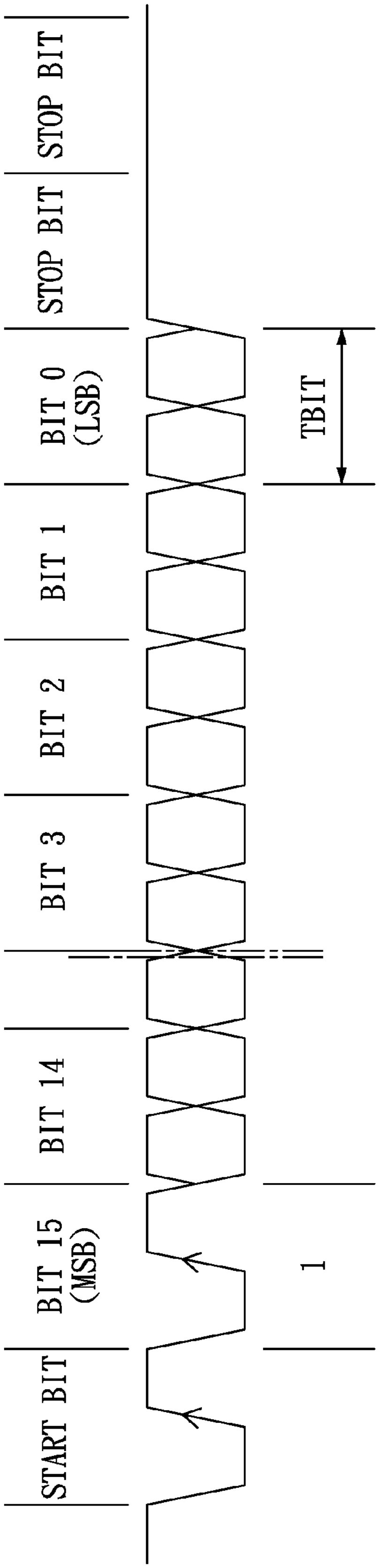
Figures 2, 4:
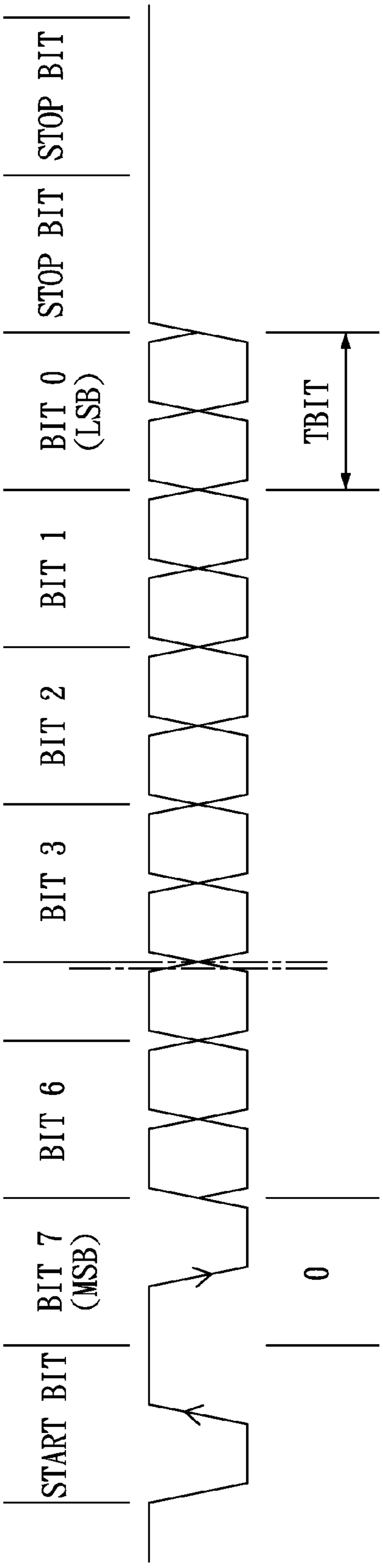

Referring FIG. 1, which is a schematic view of one embodiment of the present invention, composed by the bus power supply 5, the system controller 7, the subarea controller 8, the human activity sensor 4 and the demarcation repeater 6. The communication protocols of the control system assigns instructions to a system instruction group and a subarea instruction group, as shown in FIG. 1, the system instruction is coded as 37 and has two bytes, the subarea instruction is coded as 38 and has one single byte, the actual code is illustrated in Table 1 and Table 2; the highest digit of the system instruction 37 is “1”, in other words two bytes with hexadecimal code and above 0x8000 can be written in the system instruction 37; the highest digit of the subarea instruction 38 is “0” for clear identification. The instructions transmitted by the system controller 7 are two-byte system instructions 37, the instruction transmission is identified via an start bit and the instruction terminating is identified via two stop bits; as shown in FIG. 4, wherein FIG. 4-1 is a waveform diagram of the system instruction, FIG. 4-2 is a waveform diagram of the subarea instruction. The transmission path of the system instructions is numbered as 9 in FIG. 1, the transmission path 9 can enter to a b zone from an a zone via passing the demarcation repeater 6. As shown in the system instructions 37 and the subarea instructions 38 of the lamp controllers 3, the lamp controllers 3 can receive the two-byte system instructions 37 and can also receive one-byte subarea instructions 38. The subarea controller 8 and the human activity sensor 4 can only send the subarea instructions 38, so the transmitted instructions are not able to pass the demarcation repeater 6 to the b zone, thus only valid in the assigned a zone, the number 10 in the FIG. 1 refers to a subarea instruction transmission path that can not pass the demarcation repeater 6. The number 1 in the FIG. 1 refers to AC electric supply while the number 2 refers to the bi-phase digital information transmission bus.

FIG. 2 is a figure for illustrating the function of the demarcation repeater 6 shown in FIG. 1, the demarcation repeater 6 is basically composed by a power supply 60 and a digital information processing device 61, the power supply 60 of the demarcation repeater 6 includes a bus power 68 of the downlink bus 2'' and a regulated power 69 supplying power to the digital information processing device 61, e.g. 5 VDC. The specification of the bus power can be with respect to the power regulation of digital addressable lighting interface of IEC 60929, which is 11.5-22.5V, and the current is smaller or equal to 250 milliampere.

The number 62 is an opto-isolator, after the digital information of the uplink bus 2' passes the opto-isolator 62 and enters the relay controller 63, the relay controller 63 processes operations of edge detection, waveform reform, start bit detection, system instruction or subarea instruction identification and digital data reform on the inputted bi-phase digital information, the reformed digital data is saved in a shift register 64. After entering the relay controller 63 but before being decoded, if the bi-phase digital information is identified as a subarea instruction then a terminating operation is processed, if identified as a system instruction, a switch device of the power 68 of the downlink bus 2'' is driven via a control gate 65, so the information is transferred to the b zone, if a collision identifying and detecting device 66 detects a collision status, then the control gate 65 is terminated to stop entering the b zone. The storing operation in the shift register 64 is not stopped until the relay controller 63 detects two stop bits and is stopped when the operation of receiving the system instructions is finished, a resend controller 67 waits for a proper delayed time then the relay controller 63 is instructed to process a resend operation, when resend, the digital data temporally stored in the register 64 is firstly processed with a bi-phase decoding operation then enters the control gate 65 to drive the downlink bus 2''. The above mentioned art of collision identifying and detecting and the art of a relay operation of firstly stored and then resend can also be designed to be bilaterally operated.

Referring to FIG. 3, which is a figure illustrating the lamp controller 3 shown in FIG. 1.

A light source 35 can be a fluorescent lamp tube, a ballast 34 thereof receives signals of pulse width modulation to process a light-adjusting operation. The control instructions of light scene transferred on the bus enter a digital information processing device 32 via the opto-isolator 31. The instructions are decoded by the digital information processing device 32 to process an operation of controlling lamps. The number 36 is a brightness adjusting and setting device, e.g. a 4-digit code switch, that can be served to process a setting operation on each of the lamps in advance or on site, according to the actual needs. The 4-digit code switch can provide 16 kinds of setting options, and the setting operation is clear and simple and is easy to be adjusted during layout. After the digits set by the brightness adjusting and setting device 36 is decoded by a decoding device 33, a pulse width modulation or a switch signal is sent to a light driving device 34 to drive the light source 35. The light driving device 34 can be a ballast, an electrical transformer or a repeater according to the light source 35 and the actual needs. The light source 35 can be an incandescent lamp, a HID or a LED.

Figure 5:
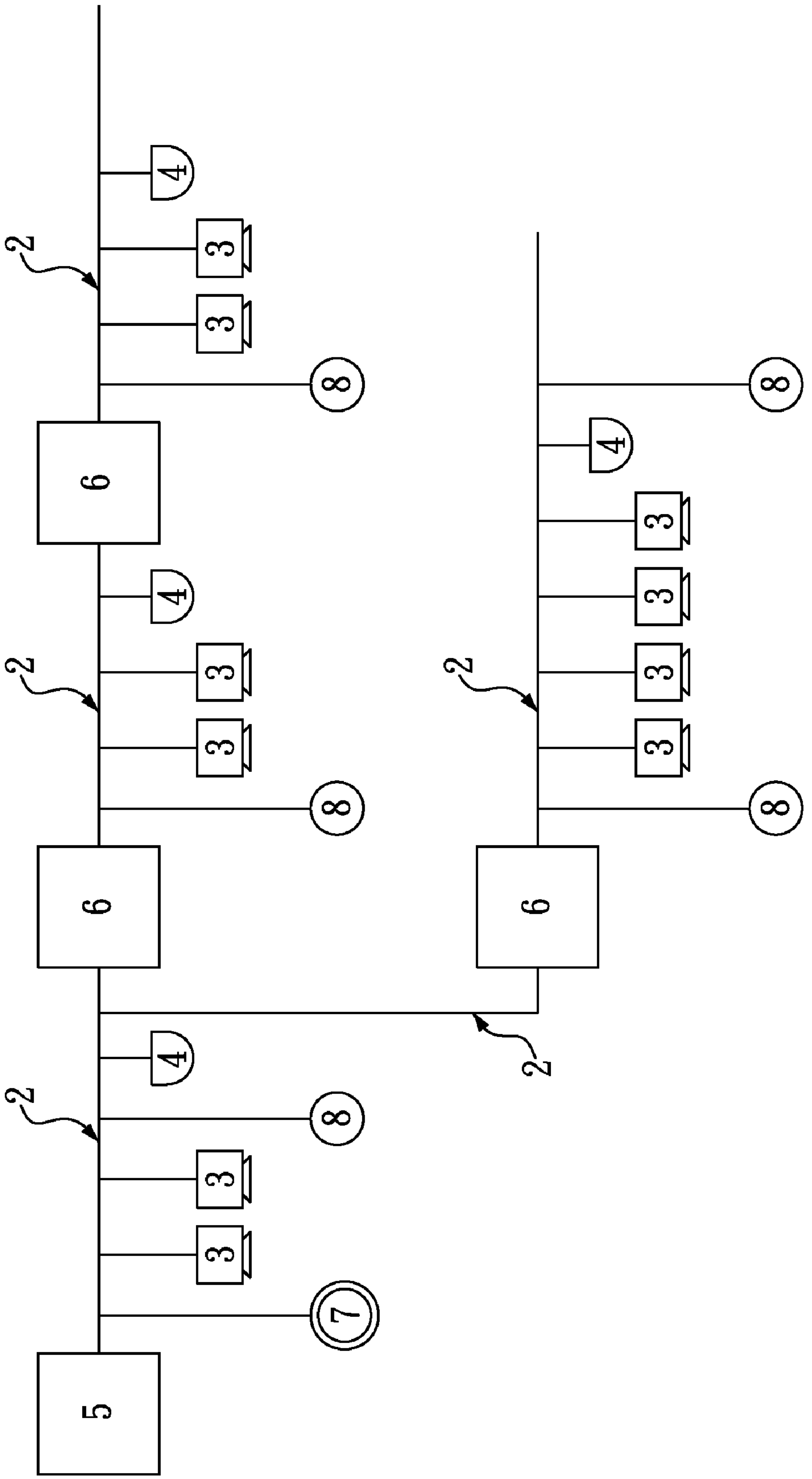
FIG. 5 is a structural schematic view of the layout of the present invention.

The control method of electrical lighting provided by the present invention has features of focusing on both of whole system control and subarea control and no need of complicated setting operations. The demarcation repeater can be operated in serial or be operated in parallel, as shown in FIG. 5. Thus layout of lamps and various kinds of controllers and sensors is more flexible and the control of electrical lighting is more convenient and easy to be operated, and objects of energy-saving and control of light scene effect are more easily to be achieved.

The present invention provides a novel solution to control electrical lighting, the solution is not based on individually searching for addresses of lamps, but a demarcation repeater is adopted to separate the serial bus served to transferring control information, so individual subareas are spontaneously defined. The communication protocols assigns instructions to system instructions and subarea instructions, the system instructions can pass the demarcation repeater, the subarea instructions are only valid in the subarea and can not pass the demarcation repeater, so the system instructions and the subarea instructions respectively provide different functions therefore a complicated setting operation is not needed, each of the subarea controllers is operated in his own subarea separated by the demarcation repeater. So the layout, maintenance, expansion and control of the lighting system are simple and clear.

To meet the actual needs of operating the lighting control system, the present invention provides a lighting control system in which each room or each area is the aim to be directly controlled. The demarcation repeater of the lighting control system separates the digital information transmission bus into individual subareas. The system instructions can pass the demarcation repeater and be forwardly transferred; the subarea instructions can not pass the demarcation repeater so as to be terminated, thus the subarea instructions are only valid in the subarea defined by the demarcation repeater. Subarea controllers and sensor controllers, e.g. human activity sensors, in all subareas are designed to only emit subarea instructions; because the subarea instructions can not pass the demarcation repeater, instruments outside of the defined subarea is not interfered. For example, a human activity sensor in a room detects that there is no human activity in the room and determines to turn off lamps, the room adjacent is not interfered.

The solution provided by the present invention is even more practical and convenient when being adopted in a remote control. The remote controls disclosed in the German Patent No. 4327809.4 and the European Patent No. 91201071 are both needed to process a setting operation on the remote control, so if individual rooms need their own remote control, each of the remote controls has to be specially set and can not be used in the room other than the assigned one. According to the solution provided by the present invention, the remote control does not need to be set so there is no space restriction, and can be used in any subarea.

The communication protocols of the control system of electrical lighting provided by the present invention separates instructions into two groups, one is system instruction group and the other one is subarea instruction group.

For the system instructions, a relay operation is processed by the demarcation repeater. The relay function of the demarcation repeater can be single-way or dual-way, but for general household lighting control, a single-way relay is enough. The reverse transmission can be served to report malfunctions. But for a small space, the malfunction of lamps is easy to be observed by bare eyes, so an automatic malfunction detection is not necessary, the production cost is therefore lowered and the single-way (forward) relay is enough.

For the subarea instructions, the relay function of the demarcation repeater is stopped so a blocking effect is generated, thus the subarea instructions are only valid in partial subareas defined by the demarcation repeater.

The communication protocols can be categorized by the length of bytes or the content of bytes or both; for a better comparison, the instructions compatible with the digital addressable lighting interfaces are adopted for illustration, for instance, the instructions of whole system broadcast provided by the present invention can be set to two bytes, the first byte is FF. The commonly used instructions of broadcast system are shown in Table 1. The subarea instruction can be set to single byte, as shown in Table 2.

TABLE 1

| system instruction | | |
|---|---|---|
| OFF | FF00 | 1111111100000000 |
| ALL LIT | FF05 | 1111111100000101 |
| SCENE 1 | FF11 | 1111111100010001 |
| SCENE 2 | FF12 | 1111111100010010 |
| SCENE 3 | FF13 | 1111111100010011 |
| SCENE 4 | FF14 | 1111111100010100 |

TABLE 2

| subarea instructions | | |
|---|---|---|
| OFF | 00 | 00000000 |
| ALL LIT | 05 | 00000101 |
| SCENE 1 | 11 | 00010001 |
| SCENE 2 | 12 | 00010010 |
| SCENE 3 | 13 | 00010011 |
| SCENE 4 | 14 | 00010100 |

Each of the lamp controllers is provided with a signal receiving, decoding and driving device to receive and execute the instructions, so control of lamps is achieved. The subarea controller and the sensor controller are mainly served to transmit the subarea instructions, so the control function thereof is constricted in the defined subarea and does not need a setting operation.

All the devices capable of sending instructions have functions of collision identifying and detecting, when subject to a collision, low potential is in the priority and high potential is not.

The demarcation repeater provided by the present invention has functions of relay and temporally storing, when subject to a collision, if the relay function of the demarcation repeater has to be retreated, the system instructions that are currently being processed with the relay operation will be terminated, only the input end thereof are not interfered, and the instruction codes thereof are continuingly being decoded and temporally stored in the register memory, and are resent after a proper period of time.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A subarea control system of electrical lighting separated by a demarcation repeater, comprises:

- a bus power supply connected to an electric supply an providing a DC voltage and limiting a current to a bi-phase digital information transmission bus;
- at least one demarcation repeater connected directly to the bus power supply via the bi-phase digital information transmission bus establishing a contact with an uplink bus and the demarcation repeater is connected directly to the electric supply and providing a bus power to a downlink bus;
- a system controller connected to the bi-phase digital information transmission bus, the system controller and the bi-phase digital information transmission bus form a transmission path, and a potential of a transmission information bus is controlled according to system instructions to broadcast the system instructions to the whole system;
- at least one subarea controller connected to the bi-phase digital information transmission bus, a potential of a information transmission cable is controlled according to subarea instructions;
- at least one group of lamp controllers respectively connected to the bi-phase digital information transmission bus to receive information instructions and to access the electric supply so the lamps are controlled according to the information instructions;
- the subarea controller and the lamp controllers form a subarea instruction transmission path whose boundary is the demarcation repeater, and the subarea instructions are valid on the subarea instruction transmission path.

2. The subarea control system of electrical lighting separated by a demarcation repeater as claimed in claim 1, wherein at least one control sensor is further provided, the at least one control sensor is connected to the bi-phase digital information transmission bus, and the potential of the information transmission cable is controlled according to the transmitted instructions.

3. The subarea control system of electrical lighting separated by a demarcation repeater as claimed in claim 2, wherein the control sensor is a human activity sensor or a light sensor or a timer.

4. The subarea control system of electrical lighting separated by a demarcation repeater as claimed in claim 1, wherein each of the lamp controllers includes a control section and a lamp.

5. The subarea control system of electrical lighting separated by a demarcation repeater as claimed in claim 1, wherein the control instructions of the system controller and the subarea controller are categorized to single-way instructions or dual-way system instructions.

6. The subarea control system of electrical lighting separated by a demarcation repeater as claimed in claim 5, wherein the control instructions are grouped by the length of bytes and the content of bytes.

7. The subarea control system of electrical lighting separated by a demarcation repeater as claimed in claim 1, wherein the demarcation repeater includes an uplink bus end and a downlink bus end.

8. The subarea control system of electrical lighting separated by a demarcation repeater as claimed in claim 1, wherein the demarcation repeater, the system controller, the subarea controller and the sensor provided within have functions of collision identifying and detecting.

9. The subarea control system of electrical lighting separated by a demarcation repeater as claimed in claim 1, wherein a digital information processing device of the demarcation repeater includes a decoding and register memory device, when receiving signals and a relay operation is processed, the decoding and register memory device is served to decode the system instructions and register in the memory device, when subject to a collision, the operations of decoding and registering are not stopped and a resend operation is processed after a delayed time.

10. The subarea control system of electrical lighting separated by a demarcation repeater as claimed in claim 9, wherein a relay controller of the digital information processing device has a function of comparing the highest digit after the start bit to identify the system instructions or the subarea instructions.

11. A subarea control method of electrical lighting separated by a demarcation repeater, comprises the steps of:

- the power is turned on so the system is in a standby status;
- connecting the demarcation repeater directly to a bus power supply and an electric supply;
- a system controller and a subarea controller respectively send instructions to a bi-phase digital information transmission bus, the system controller sends system instructions and the subarea sends subarea instructions;
- the system instructions are processed with a relay operation and the subarea instructions are processed with a terminate operation, both by the demarcation repeater;
- the lamp controllers process operations of instruction receiving and decoding to the system instructions and the subarea instructions, so control of the lamps is achieved.

12. The subarea control method of electrical lighting separated by a demarcation repeater as claimed in claim 11, wherein the control instructions of the communication protocols of the control system are categorized to single-way system instructions, dual-way system instructions and subarea instructions.

13. The subarea control method of electrical lighting separated by a demarcation repeater as claimed in claim 12, wherein the control instructions are grouped by the length of bytes and the content of bytes, thus a system instruction group and a subarea instruction group are defined.

14. The subarea control method of electrical lighting separated by a demarcation repeater as claimed in claim 11, wherein the demarcation repeater includes an uplink bus end and a downlink bus end.

15. The subarea control method of electrical lighting separated by a demarcation repeater as claimed in claim 11, wherein the demarcation repeater, the system controller, the subarea controller and the sensors provided within have functions of collision identifying and detection.

16. The subarea control method of electrical lighting separated by a demarcation repeater as claimed in claim 11, wherein a digital information processing device of the demarcation repeater includes a decoding and register memory device, when receiving signals and a relay operation is processed, the decoding and register memory device is served to decode the system instructions and register in the memory device, when subject to a collision, the operations of decoding and registering are not stopped and a resent operation is processed after a delayed time.

17. The subarea control method of electrical lighting separated by a demarcation repeater as claimed in claim 16, wherein a relay controller of the digital information processing device has a function of comparing the highest digit after the start bit to identify the system instruction or the subarea instruction.

* * * * *